July 20, 1943.  J. M. CUSTENBORDER  2,324,563
TRACTOR MOWER ASSEMBLY
Filed Aug. 16, 1941  4 Sheets-Sheet 1

Inventor:
John M. Custenborder
By:— Tefft + Tefft. Att'ys.

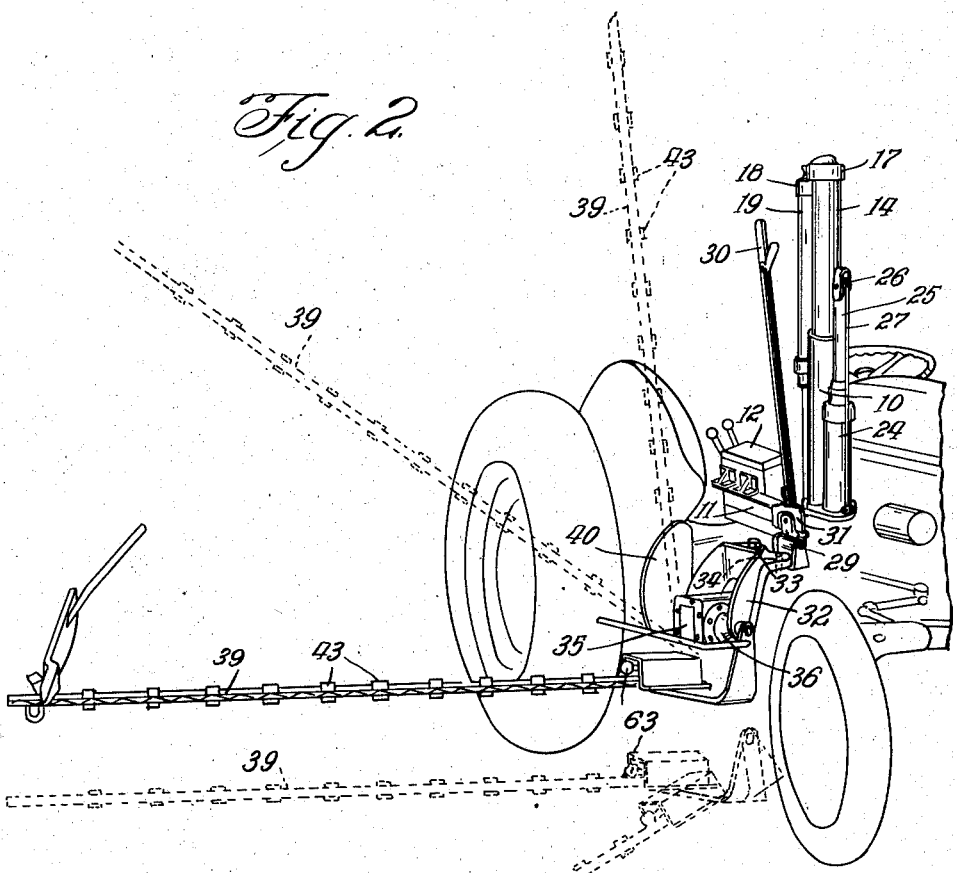
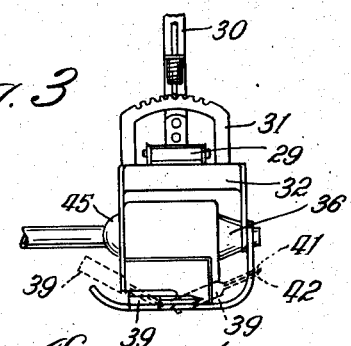

Inventor:
John M. Custenborder
By Tefft & Tefft
Att'ys.

July 20, 1943.    J. M. CUSTENBORDER    2,324,563
TRACTOR MOWER ASSEMBLY
Filed Aug. 16, 1941    4 Sheets—Sheet 4
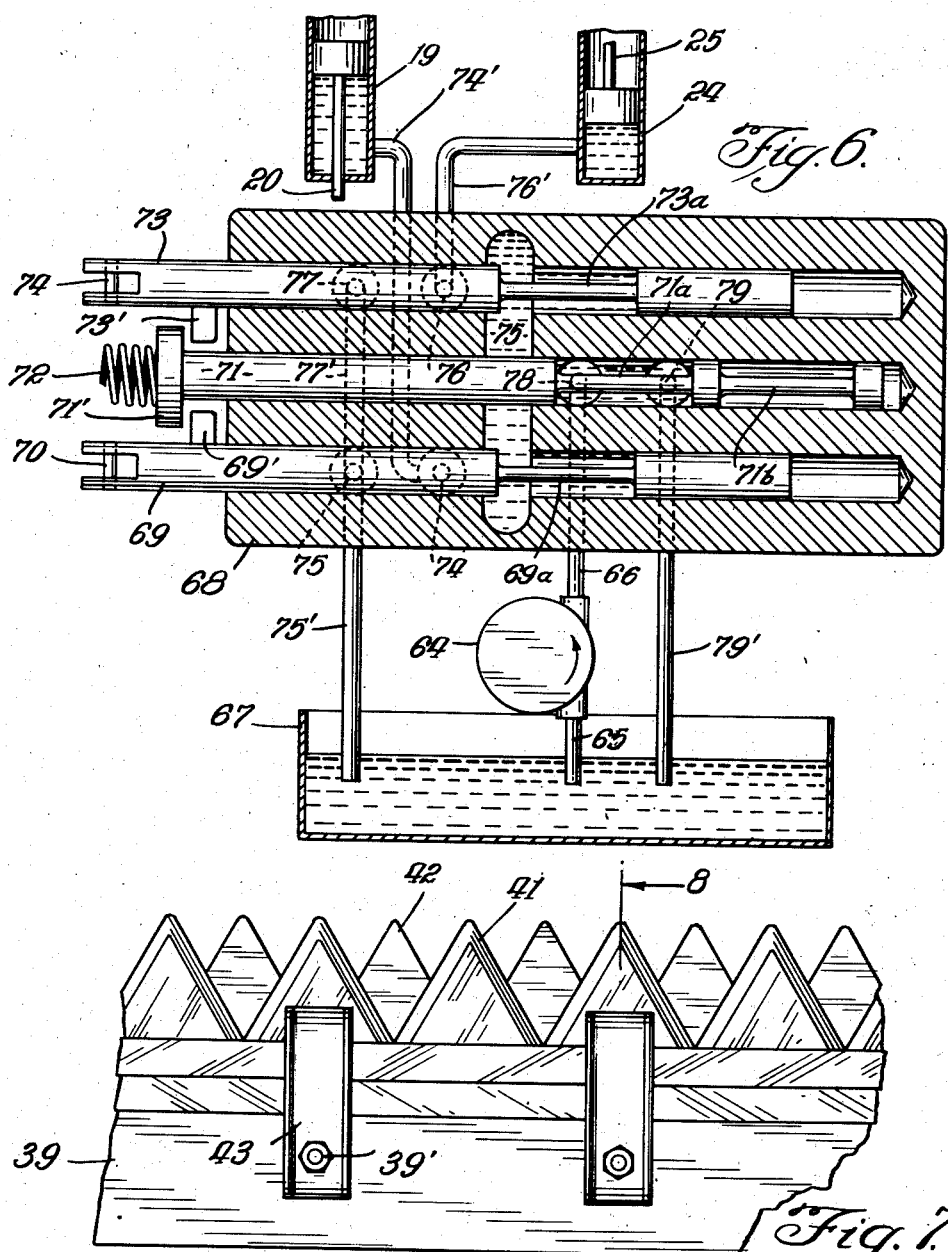
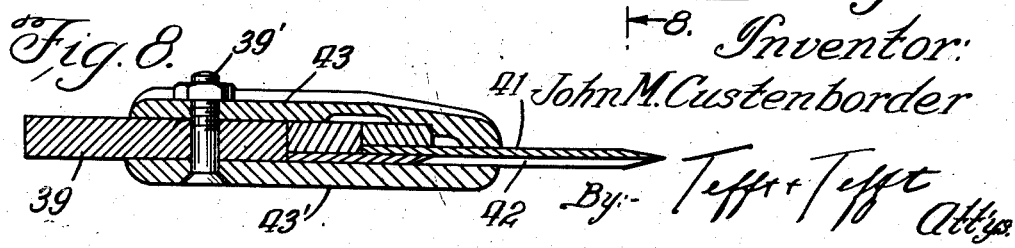
Inventor:
John M. Custenborder
By:— Tefft + Tefft Attys.

Patented July 20, 1943

2,324,563

UNITED STATES PATENT OFFICE 2,324,563

TRACTOR MOWER ASSEMBLY

John M. Custenborder, Peoria, Ill.

Application August 16, 1941, Serial No. 407,152

6 Claims. (Cl. 56—25)

This invention relates to mowing machines employing reciprocating cutter bars, and particularly to a mowing apparatus adapted to be mounted on a conventional farm tractor.

Although my mower may be used on ordinary farm mowing jobs, it is particularly designed to handle a wide variety of difficult mowing operations met with in mowing public highways, parks, golf courses, embankments, levies, etc. Conditions found in this type of work require a wide manipulation of the cutter bar with respect to the plane of the tractor, both vertical and angular. Further, it will be appreciated that often very difficult untilled sections are encountered having rough vegetation, requiring especially effective cutter bars. Mowers for this type of work must be easily and quickly handled with a minimum of manual effort and must be capable of withstanding severe service without the necessity for frequent adjustments and repairs.

It is the particular object of this invention to provide a mowing machine which may be mounted on a conventional farm tractor and which embodies all the desirable characteristics above described.

Other objects and benefits will be disclosed in the following descriptions and drawings, in which:

Fig. 2 is a forward angular perspective view similar to Fig. 1, showing the various adjustments of the cutter bar in dotted outline;

Fig. 3 is a front elevational view of the driving head and supporting frame showing how the cutter bar may be tilted by the hand lever adjustment, as is required under certain difficult cutting conditions;

Fig. 6 is a cross-sectional plan view of my control valve with the pump and cylinder connections shown diagrammatically, as will later be explained;

Fig. 7 is a broken plan view of my twin sickle cutter bar; and

Fig. 8 is a cross-sectional view of the same cutter bar as shown in Fig. 7, as it would appear on the section line 8—8 of Fig. 7.

Figure 1:
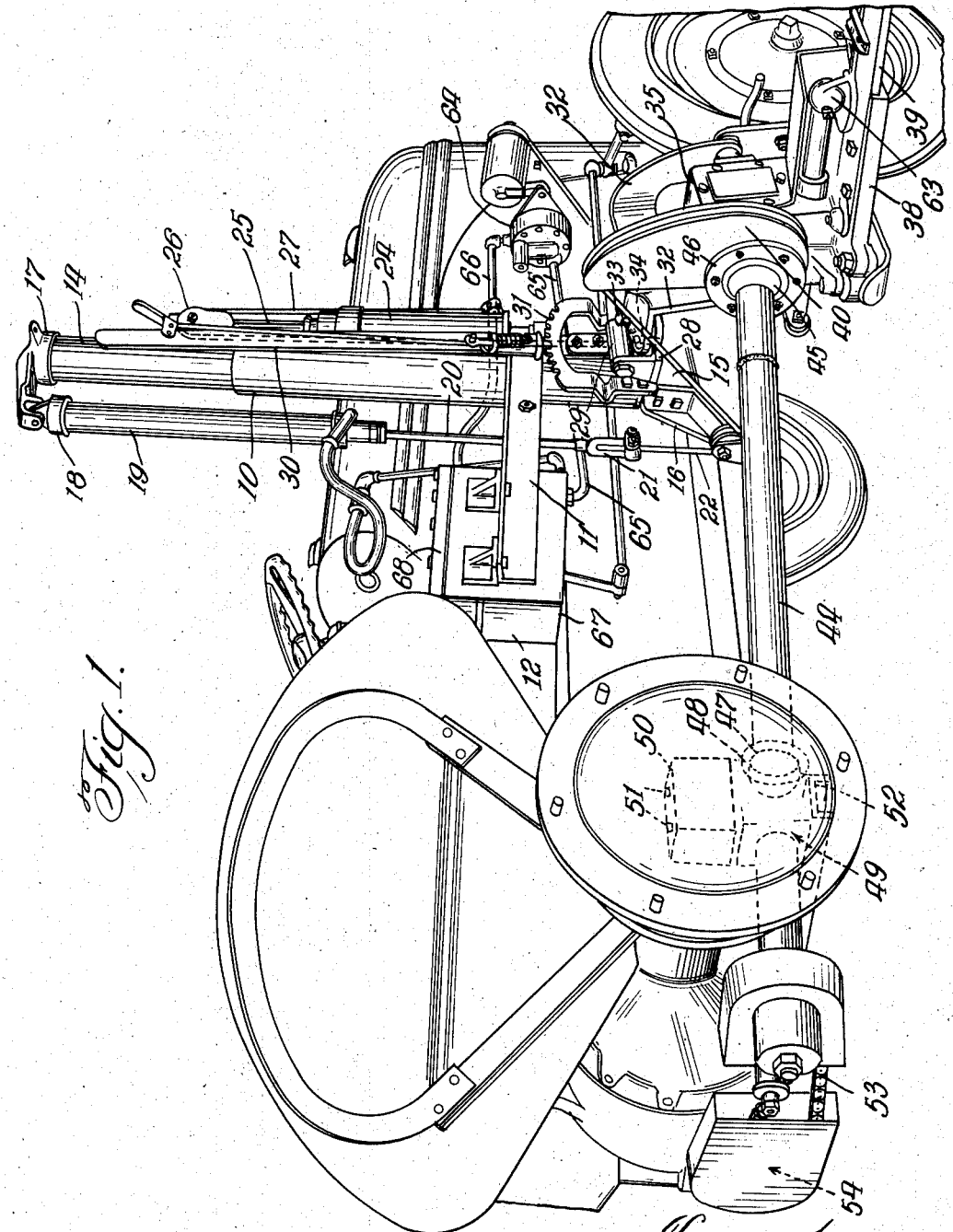
Fig. 1 is a rear angular perspective view showing my mower mounted on a farm tractor with certain parts of the tractor removed or broken away to better disclose the mower details.

Now referring to the drawings, and, at the outset, particularly to Figs. 1, 2 and 3, my mower mechanism is adjustably supported on a support tube 10 affixed to a support angle iron 11 attached to the control valve and mechanism attached to the control box 12, the entire mechanism being supported from the tractor frame by conventional structure (not shown). Within the support tube 10 is a slidable tube 14 having a bottom support casting 15 carrying a pulley bracket 16. On the top of the tube 14 is a cap member 17 pivotally supporting a cylinder cap 18 attached to the cylinder 19. This cylinder 19 is a conventional piston type cylinder having a piston rod 20 carrying a cable clamp 21 and a cable 22. On the opposite side of the support tube 10 and attached to the support angle iron 11 is a piston type cylinder 24 having a piston rod 25 and a pulley bracket 26. A cable 27 is fixed to the support member 15 and running over the pulley in the bracket 26 is attached at its other end to the support casting 15.

It will be obvious from this arrangement that when the cylinder 24 actuates the pulley bracket 26 upward, the support tube 14 and the entire mower mechanism are vertically lifted, as shown in Fig. 2. Similarly, it will be understood that when the cylinder 19 pulls the cable 22 upward the mower bar is tilted angularly upward, as shown in Fig. 2, by a mechanism which will later be described. Pivotally mounted in the lower support casting 15 is a support bracket 28 and pivotally attached to the bracket 28 is a lever bracket 29 carrying a conventional adjustment lever 30 coacting with a rack bracket 31 supported by the support member 15. This arrangement provides means to pivot the support plate 28 in the support bracket 15, whereupon the attached cutter bar may be tilted downwardly or upwardly to present the twin sickle bar to the vegetation at the most effective angle, as clearly shown in Fig. 3.

Pivotally supported on the plate 28 by a pivot bolt 33 is a cutter head bracket 32. The cutter head bracket 32 is prevented from pivoting on the bolt 33 normally by a brake pin 34 arranged to shear under dangerous stresses. By this arrangement, when the cutter bar meets an obstruction, damage is averted by shearing of the brake pin 34, whereupon the entire cutter bar is pivoted rearwardly to avoid damage.

Figure 4:
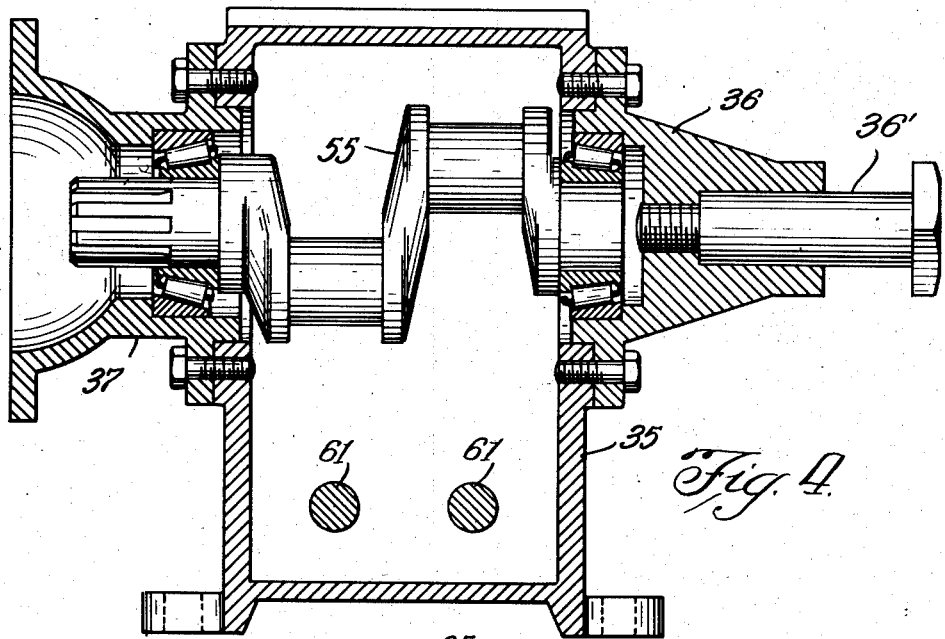
Fig. 4 is an enlarged front elevational, cross-sectional view of the driving head showing the double-throw crank shaft employed in driving my dual sickle bars.
Figure 5:
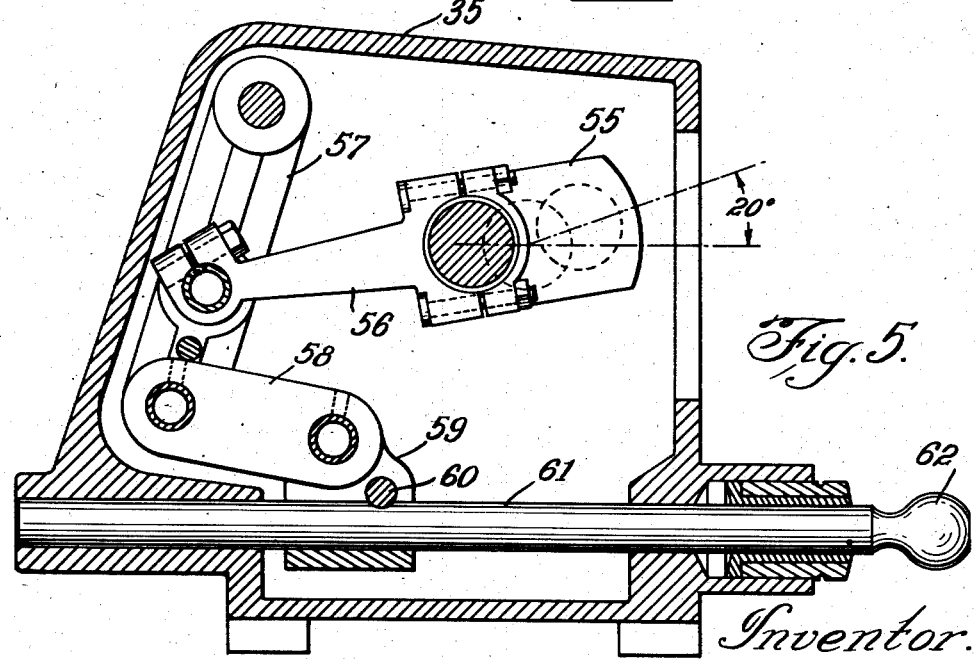
Fig. 5 is a side elevational, cross-sectional view of the driving head, showing the reciprocating apparatus for driving the sickle bars.

Now referring to Figs. 4 and 5, the drive head housing 35 is pivotally mounted in the cutter head bracket 32 by means of the side brackets 36 and 37 and the shoulder bolt 36'. Bolted to the bottom of the cutter head bracket 32 is the cutter bar head 38 supporting a conventional cutter bar 39. By this arrangement it will be understood that the cutter bar 39 is pivotally attached to the cutter head bracket 32 and that the entire cutter mechanism may be pivoted angularly upward by the cylinder 19 and the cable 22 attached to the lifting cam 40 which is mounted on the bracket 37 which encloses the ball 45 of the tube 44 by the retainer ring 46 and through bolts, as shown. The thrust tube 44 has another ball joint 47 on its rear end locked in the socket of a universal housing 49 by means of a retainer ring 48, and the entire structure is supported on the rear axle boss 50 by through bolts 51 which also attach a channel bar 52 which extends across the rear axle and is bolted to the other side in a conventional manner. The universal housing 49 supports a transmission shaft (not shown) which is driven by a conventional chain drive 53 from the conventional power take-off shaft 54 (not shown). The transmission shaft driven by the chain drive 53 is connected in a conventional manner to the crank 55 in the housing 35, it being understood that universal joints are enclosed within the ball joints in order to provide for the adjustments of the cutter bar, as previously described. This type of transmission is well known in the art and no further detailed description is deemed necessary.

It will be appreciated that whereas the entire mower mechanism is vertically supported by the support tube 30—14 and companion cylinders 19 and 24 with their associated mechanisms, this support structure is ill adapted to receive any backward thrust from the mower bar. This backward thrust is taken care of entirely by the thrust tube 44 and transmitted to the rear axle of the tractor by the mechanism, as described.

Again referring to Fig. 1, it will be noted that I mount a conventional type of pressure pump 64 adjacent the front end of the tractor motor and drive it from the belt pulley transmission located at this point. The electric generator which is usually mounted in this position is moved outwardly and mounted as shown.

Now referring to Figs. 7 and 8, I show a conventional cutter bar 39 on which twin sickle bars 41 and 42 are mounted by slide clips 43 and 43' and through bolts 39'. The general structure of cutter bars of this nature is well understood in the art and it is believed that a further detailed description will not be required.

Now referring to Figs. 4 and 5, it will be noted that the double-throw crank 55 has one wrist pin offset by 20°, as clearly shown in Fig. 5. This is to prevent the on-center position of the cranks at the extreme end of the throw. The cranks are connected by connecting rods 56 attached to swing links 57 and drive links 58 to the sickle piston rod 61 by means of the connecting brackets 59 and through pins 60. The sickle piston rods 61 have ball ends 62 which are attached to the sickle bars by means of socket joints 63, as clearly shown in Fig. 1. This mechanism transmits the rotary motion of the crank 55 to reciprocating motion of the sickle pistons 61, thereby reciprocating the sickle bars 41 and 42 in opposite directions to effect scissor-like cutting strokes to the sickle bars.

Now referring to Fig. 6, I show somewhat diagrammatically my control valve and oil reservoir. The pump 64 has an intake pipe 65 from the reservoir 67 and pumps the oil through the tube 66 and the port 78 whereby, by means of the reduced diameter valve rods 71a, the fluid is returned to the reservoir by means of the port 79 and the return tube 79'. Therefore, in this position of the control valve the pump 64 is merely idling its flow of oil back to the reservoir. The valve body 68 encloses three valve rods, namely, 69, 71 and 73. These valve rods are actuated by a pair of handles attached to pins 70 and 74. When the rod 69 is pulled outwardly so that the port 74 is uncovered, the projection 69' on the rod 69 abuts the shoulder 71' of the pin 71 and, pulling it against the compression spring 72, opens the manifold port 75 by connecting the port 68 with the manifold 75. The oil thereby flows from the port 78 through the manifold 75 and into the port 74 through the tube 74' to raise the piston in the cylinder 19. By pulling the valve rod 69 further outwardly so that the ports 74 and 75 are uncovered, the oil returns from the cylinder 19 through the tube 74' and back to the reservoir 67 through the ports 74-75 to the tube 75'. It will be noted that when the rod 69 is thus pulled outwardly it is necessary to free the pump 64 and this is done by the valve opening 71b uncovering the ports 78 and 79. Similarly, when it is desired to actuate the piston 25, the rod 74 is pulled outwardly, which uncovers the port 76 and permits oil to flow to the cylinder through the tube 76'. When the cylinder 24 is to be released the rod 73 is pulled further outwardly, uncovering the ports 76 and 77 to return the oil to the reservoir through the return tube 77'. By this combination of three valve rods I have provided a fool-proof control by means of two handles whereby any operation of the cylinders 19 and 24 may be quickly and promptly accomplished.

What I claim as new and desire to secure by Letters Patent is:

1. In a mowing machine, a sickle bar driving head, a cutter bar carrying said sickle bar mounted on said driving head, dual pivoted supporting means for said head to permit both vertical and horizontal pivoting of the driving head and bar, vertically slidable support means for said pivotal support means, said cutter bar being operable while being adjusted and in all its adjusted positions and a jointed thrust member attached to the head to resist horizontal movement of the head and bar in all positions of the bar.

2. In a mowing machine, a sickle bar driving head, a cutter bar carrying said sickle bar mounted on said driving head, dual pivoted supporting means for said head to permit both vertical and horizontal pivoting of the driving head and bar, vertically slidable support means for said pivotal support means, said cutter bar being operable while being adjusted and in all its adjusted positions, a jointed thrust member attached to the head to resist horizontal movement of the head and bar in all positions of the bar, and a drive shaft to the drive head housed in the thrust member arranged to avoid all thrust loads from the driving head.

3. In a mowing machine, a sickle bar driving head, a cutter bar carrying said sickle bar mounted on said driving head, triple pivot supporting means for said head to permit vertical, horizontal and radial pivoting of the driving head bar, vertically slidable support means for said pivotal support means, said cutter bar being operable while being adjusted and in all its adjusted positions, a jointed thrust member attached to the head to resist horizontal movement of the head and bar in all positions of the bar, and a drive shaft to the drive head housed in the thrust member arranged to avoid all thrust loads from the driving head.

4. In a mowing machine, a sickle bar driving head, a cutter bar carrying said sickle bar mounted on said driving head, dual pivoted supporting means for said head to permit both vertical and horizontal pivoting of the driving head and bar, vertically slidable support means for said pivotal support means, said cutter bar being operable while being adjusted and in all its adjusted positions, dual hydraulic cylinder means for actuating said horizontal and vertical supporting means, a jointed thrust member attached to the head to resist horizontal movement of the head and bar in all positions of the bar, and a drive shaft in the drive head housed in the thrust member.

5. In a mowing machine, a sickle bar driving head, a cutter bar carrying said sickle bar mounted on said driving head, dual pivoted supporting means for said head to permit both vertical and horizontal pivoting of the driving head and bar, vertically slidable support means for said pivotal support means, dual hydraulic cylinder means for actuating said horizontal and vertical supporting means, said cutter bar being operable while being adjusted and in all its adjusted positions, hydraulic pump and reservoir means for actuating the cylinders, an interconnected valve for controlling the pump to permit flow of liquid to either of the dual cylinders or return the pump flow to the reservoir while preventing stoppage of the pump flow, a jointed thrust member attached to the head to resist horizontal movement of the head and bar in all positions of the bar, and a drive shaft to the drive head housed in the thrust member.

6. In a tractor mower having a clutch control power take-off, clutch control power transmission to the wheels and a fan belt transmission from the front end of the motor to the pump, the combination in a mower attachment having a sickle bar driving head, a cutter bar carrying said sickle bar mounted on said driving head and dual pivoted supporting means for said head to permit both vertical and horizontal pivoting of the driving head and bar, vertically slidable support means for said pivotal support means attached to said tractor, said cutter bar being operable while being adjusted and in all its adjusted positions, a jointed thrust member attached to the head and the rear axle of the tractor to resist horizontal movement of the head and bar in all positions of the bar, a drive shaft to the drive head housed in the thrust member and driven by the power take-off, dual hydraulic cylinder means for actuating said horizontal and vertical supporting means for horizontal and angular adjustment of the cutter bar, and hydraulic pump means for actuating the cylinders driven from the front end of the motor whereby the cutter bar may be adjusted by power from the motor to any horizontal or vertical position whether the tractor or the cutter bar is in motion or stationary.

JOHN M. CUSTENBORDER.